United States Patent
Yasuoka et al.

(10) Patent No.: US 9,780,840 B2
(45) Date of Patent: Oct. 3, 2017

(54) WIRELESS POWER TRANSMITTER AND RECEIVER

(71) Applicant: ROHM CO., LTD., Ukyo-Ku, Kyoto (JP)

(72) Inventors: Kazuyoshi Yasuoka, Kyoto (JP); Tatsuya Iwasaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 190 days.

(21) Appl. No.: 14/729,435

(22) Filed: Jun. 3, 2015

(65) Prior Publication Data
US 2015/0349851 A1 Dec. 3, 2015

(30) Foreign Application Priority Data
Jun. 3, 2014 (JP) ................................ 2014-115052

(51) Int. Cl.
*H04B 5/00* (2006.01)
*H02J 50/80* (2016.01)
*H02J 7/02* (2016.01)
*H02J 50/10* (2016.01)

(52) U.S. Cl.
CPC ............ *H04B 5/0037* (2013.01); *H02J 50/80* (2016.02); *H04B 5/0031* (2013.01); *H04B 5/0081* (2013.01); *H02J 7/025* (2013.01); *H02J 50/10* (2016.02)

(58) Field of Classification Search
CPC . H04B 5/005; H02J 50/80; H02J 7/025; H02J 50/10
USPC .......................................................... 307/104
See application file for complete search history.

(56) References Cited

U.S. PATENT DOCUMENTS

2014/0153491 A1* 6/2014 Lee .......................... H02J 17/00
370/328

FOREIGN PATENT DOCUMENTS

JP          2010288443  A    12/2010

* cited by examiner

*Primary Examiner* — Robert Deberadinis
(74) *Attorney, Agent, or Firm* — Cantor Colburn LLP

(57) ABSTRACT

A power transmitter supplies an electric power signal to a wireless power receiver. A transmission antenna is configured to transmit the electric power signal, and to receive data from the wireless power receiver. The data includes personal data that indicates user-specific information with respect to the user of the wireless power receiver, in addition to control data to be used to control the wireless power transmitter. A driver drives the transmission antenna. A controller controls the driver according to the control data received via the transmission antenna, and acquires the personal data.

16 Claims, 4 Drawing Sheets

WIRELESS POWER TRANSMITTER AND RECEIVER

CROSS REFERENCE TO RELATED APPLICATIONS

The present invention claims priority under 35 U.S.C. §119 to Japanese Application No. 2014-115052 filed Jun. 3, 2014, the entire content of which is incorporated herein by reference.

BACKGROUND OF THE INVENTION

Field of the Invention

The present invention relates to a wireless power supply technique.

Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

The wireless power supply according to the Qi standard uses electromagnetic induction that occurs between a transmission coil and a reception coil. A power supply system is configured comprising a power transmitter including a transmission coil and a power receiver including a reception coil.

In the Qi standard, a protocol is defined for communication between a power transmitter and a power receiver, which enables information transmission from the power receiver to the power transmitter via a data packet. The data packet is transmitted from a reception coil (secondary coil) to a transmission coil (primary coil) in the form of an AM (Amplitude Modulation) modulated signal using backscatter modulation. The data packet includes electric power control data for controlling an amount of electric power to be supplied to the power receiver.

With conventional communication protocols, such data packets to be transmitted from a power receiver to a power transmitter include only packets that relate to authentication or otherwise an electric power control operation. Examples of such data packets include an electric power control packet, an error indicator packet, a negotiation packet, a received power notice packet, and the like.

SUMMARY OF THE INVENTION

The present invention has been made in view of such a situation. Accordingly, it is an exemplary purpose of an embodiment of the present invention to provide a wireless power supply technique that provides new added value for a user of a power receiver and/or a provider who installs a power transmitter, and/or a wireless power supply technique that provides improved convenience.

An embodiment of the present invention relates to a wireless power transmitter that supplies an electric power signal to a wireless power receiver. The wireless power transmitter comprises: a transmission antenna configured to transmit the electric power signal, and to receive, from the wireless power receiver, data including personal data that indicates user-specific information with respect to a user of the wireless power receiver in addition to control data to be used to control the wireless power transmitter; a driver that drives the transmission antenna; and a controller that controls the driver according to the control data received via the transmission antenna, and that acquires the personal data.

With such an embodiment, the communication protocol is extended and configured so as to allow the wireless power receiver to transmit the personal data to the wireless power transmitter, in addition to transmitting the control data. This allows the power transmitter to provide the user of the wireless power receiver with various kinds of services using the personal data.

Also, the wireless power transmitter may further comprise: a display device; and a display control unit that instructs the display device to display information that corresponds to the personal data.

Such an arrangement is capable of providing information and entertainment optimized for the user of the power receiver, who has free time during the charging operation. This contributes to deterring the user from operating the power receiver (electronic device), thereby reducing the charge time, which is an additional advantage.

Also, the wireless power transmitter may further comprise a network adapter. Also, the display control unit may be configured to acquire information that corresponds to the personal data via a network.

Also, the wireless power transmitter may further comprise: a network adapter; and a data transmission unit that uploads information included in the personal data to a server connected via a network.

This allows the provider of the wireless power transmitter to accumulate, in the server, information included in the personal data.

Also, the user-specific information may include at least one from among data items representing a user's sex, age, residence, nationality, language, birth date, interests, concerns, occupation, family structure, and a keyword voluntarily entered by the user, with respect to a user of the wireless power receiver.

The user-specific information may be input beforehand by the user of the wireless power receiver before the power supply operation.

Also, the wireless power transmitter may conform to the Qi standard.

Another embodiment of the present invention relates to a wireless power receiver that receives an electric power signal from a wireless power transmitter. The wireless power receiver comprises: a reception antenna configured to receive the electric power signal, and to transmit data to the wireless power transmitter; a rectifier circuit that rectifies a current that flows through the reception antenna; a smoothing capacitor that is connected to an output of the rectifier circuit, and that generates a rectified voltage; a control circuit that generates data that is to be transmitted via the reception antenna, and that includes control data to be used to control the wireless power transmitter and personal data that indicates user-specific information with respect to a user of the wireless power receiver; and a modulator that modulates, according to the data, a voltage or a current provided by the reception antenna.

With such an embodiment, the communication protocol is extended and configured so as to allow the wireless power receiver to transmit the personal data to the wireless power transmitter, in addition to transmitting the control data. This allows the power transmitter to provide the user of the power receiver with various kinds of services using the personal data.

Also, the user-specific information may include at least one from among data items representing a user's sex, age, residence, nationality, language, birth date, interests, concerns, occupation, family structure, and a keyword voluntarily entered by the user, with respect to a user of the wireless power receiver.

The personal data may be input beforehand by the user of the wireless power receiver.

Also, the wireless power receiver may conform to the Qi standard.

Another embodiment of the present invention relates to an electronic device. The electronic device comprises any one of the aforementioned wireless power receivers. The electronic device may further comprise an input device that allows the user to input the personal data.

Yet another embodiment of the present invention relates to a wireless power supply system. The wireless power supply system includes any one of the aforementioned wireless power transmitters and any one of the aforementioned wireless power receivers.

It should be noted that any combination of the aforementioned components, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
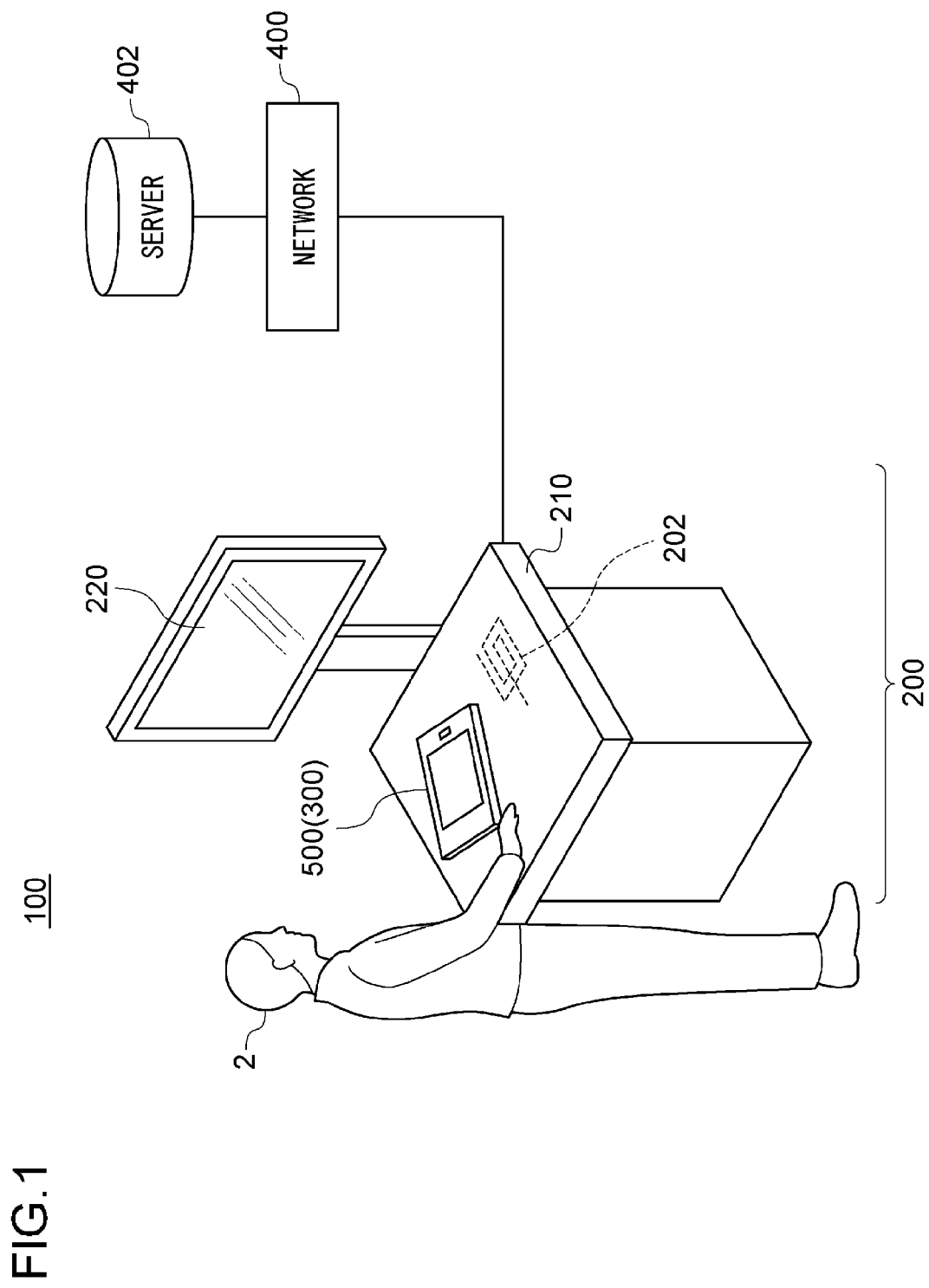
FIG. 1 is a diagram showing a configuration of a wireless power supply system according to an embodiment.

FIG. 1 is a diagram showing a configuration of a wireless power supply system 100 according to an embodiment. The power supply system 100 includes a power transmitter 200 (TX: Power Transmitter) and a power receiver 300 (RX: Power Receiver). The power receiver 300 is mounted on an electronic device 500 such as a cellular phone terminal, a smartphone, an audio player, a game machine, a tablet terminal, or the like. Basically, the power supply system 100 may be configured according to the Qi standard. Also, the power supply system 100 may be configured according to an extended standard based on the Qi standard. The power transmitter 200 may be installed at a location such as a commercial facility that a large number of unspecified users can visit, examples of which include an airport, cafe, restaurant, department store, supermarket, and the like.

The power transmitter 200 includes a power supply mount 210 on which the power receiver 300 can be mounted. The power supply mount 210 includes, as built-in components, a transmission antenna 201, a control circuit, and the like, which will be described later.

The power transmitter 200 includes a display device 220 in addition to the power supply mount 210. The display device 220 displays text information, image information, audio information, and the like, for a user 2 of the electronic device 500.

More specifically, the power transmitter 200 transmits an electric power signal S1 to the power receiver 300, and receives data S2 from the power receiver 300. The data S2 includes personal data S2$b$ that represents user-specific information with respect to the user 2 of the power receiver 300, in addition to control data S2$a$ to be used to control the power transmitter 200.

The power transmitter 200 controls the transmitted electric power according to the control data S2$a$ thus received. Furthermore, the power transmitter 200 instructs the display device 220 to display the information that corresponds to the personal data S2$b$.

The power receiver 300 receives the electric power signal S1. Furthermore, the power receiver 300 generates data to be transmitted to the power transmitter 200, i.e., the control data S2$a$ and the personal data S2$b$. Subsequently, the data thus generated is transmitted to the power transmitter 200. The personal data S2$b$ may be transmitted together with ID (identification) data in the authentication/setting phase, for example. Also, the personal data S2$b$ may be transmitted in the negotiation phase. Also, the personal data S2$b$ may be transmitted in the power transfer phase.

The power transmitter 200 is connected to a network 400. The information to be displayed on the display device 220 may be acquired via the network 400. Also, such information may be stored in a storage apparatus such as a hard disk, an SSD (Solid State Drive), or the like, built into the power transmitter 200.

Also, the power transmitter 200 may upload the personal data S2$b$ received from the power receiver 300 to the server 402 connected via the network 400.

The above is the configuration of the power supply system 100. With the power supply system 100, the communication protocol defined in the present wireless power supply is extended so as to allow the power receiver 300 to transmit the personal data S2$b$ that represents the information with respect to the user 2 to the power transmitter 200, in addition to transmitting the control data S2$a$. With this, the power transmitter 200 is capable of providing the user 2 with various kinds of services using the personal data S2$b$.

Next, description will be made regarding more specific features of the power supply system 100.

As the information with respect to the user 2 of the power receiver 300, the personal data S2$b$ may include at least one of the following items, i.e., (i) sex, (ii) age, (iii) residence, (iv) nationality, (v) language used, (vi) birth date, (vii)

interests and concerns, (viii) occupation and business type, (ix) family structure, and (x) keywords voluntarily entered by the user.

For example, in a case in which the personal data S2b includes (i) sex data and (ii) age data, the power transmitter 200 is able to display the information that corresponds to the sex and age of the user 2. For example, if the personal data S2b indicates that the user 2 is a man in his twenties, the power transmitter 200 may display information with respect to new car models, and specifically, related articles, advertisements, catalogs, or the like, with respect to the new car models. Also, if the personal data S2b indicates that the user 2 is a woman in her thirties, the power transmitter 200 may display information with respect to cosmetics, fashions, or the like.

Also, in a case in which the personal data S2b includes (iii) residence data, the power transmitter 200 may display information with respect to the distance to the residence, routes to the residence, available traffic service information, or the like.

In a case in which the power transmitter 200 is installed in a facility such as an airport that can be used by people of diverse nationalities, the power transmitter 200 is capable of switching the language to be displayed on the display device 220 based on (iv) nationality data and (v) language used data.

In a case in which the personal data S2b includes (vi) interests and concerns data, the power transmitter 200 may instruct the display device 220 to provide the user 2 with information that relates to a category which is of interest to the user 2.

Also, in a case in which the personal data S2b includes (viii) occupation and business type data, the power transmitter 200 may instruct the display device 220 to provide the user 2 with news that relates to the user's occupation and business type.

The power transmitter 200 may select multiple content candidates based on the personal data S2b, and may display the content candidates thus selected on the display device 220 so as to allow the user 2 to make a desired selection.

It should be noted that the data items to be included in the personal data S2b can preferably be selected by the user 2.

As described above, the power transmitter 200 acquires the user-specific information so as to display the information optimized for the user 2 on the display device 22. Such an arrangement further provides the following advantage to the user 2 in addition to the advantage of providing entertainment and useful information. In general, the remaining battery level of the power receiver 300 is low before the power supply operation for the power receiver 300. Thus, the user 2 would be better off suspending the use of the power receiver 300 in the charging operation because the use of the power receiver 300 would lead to an increased charging time. By displaying the information required for the user 2 on the display device 220, such an arrangement is capable of attracting the user's attention, thereby deterring the user 2 from operating the power receiver 300.

In a case in which the power transmitter 200 uploads the personal data S2b received from the power receiver 300 to the server 402 connected via the network 400, the provider of the power transmitter 200 is able to acquire information with respect to a large number of unspecified users 2. Such information is also referred to as "big data", which is useful and valuable from a commercial viewpoint. Thus, if the value of data accumulated in the server 402 exceeds the costs required to install the power transmitter 200, this becomes a great incentive to widely disseminate the power transmitter 200.

The power transmitter 200 may issue an electronic coupon instead of or otherwise in addition to displaying the information on the display device 220. For example, such an electronic coupon may be configured as a voucher or advertisement for shops in the facility where the power transmitter 200 is installed or otherwise for shops in the vicinity of the facility. In this case, the provider of the power transmitter 200 may receive compensation from the shops for distributing such an electronic coupon or advertisement.

Figure 2:
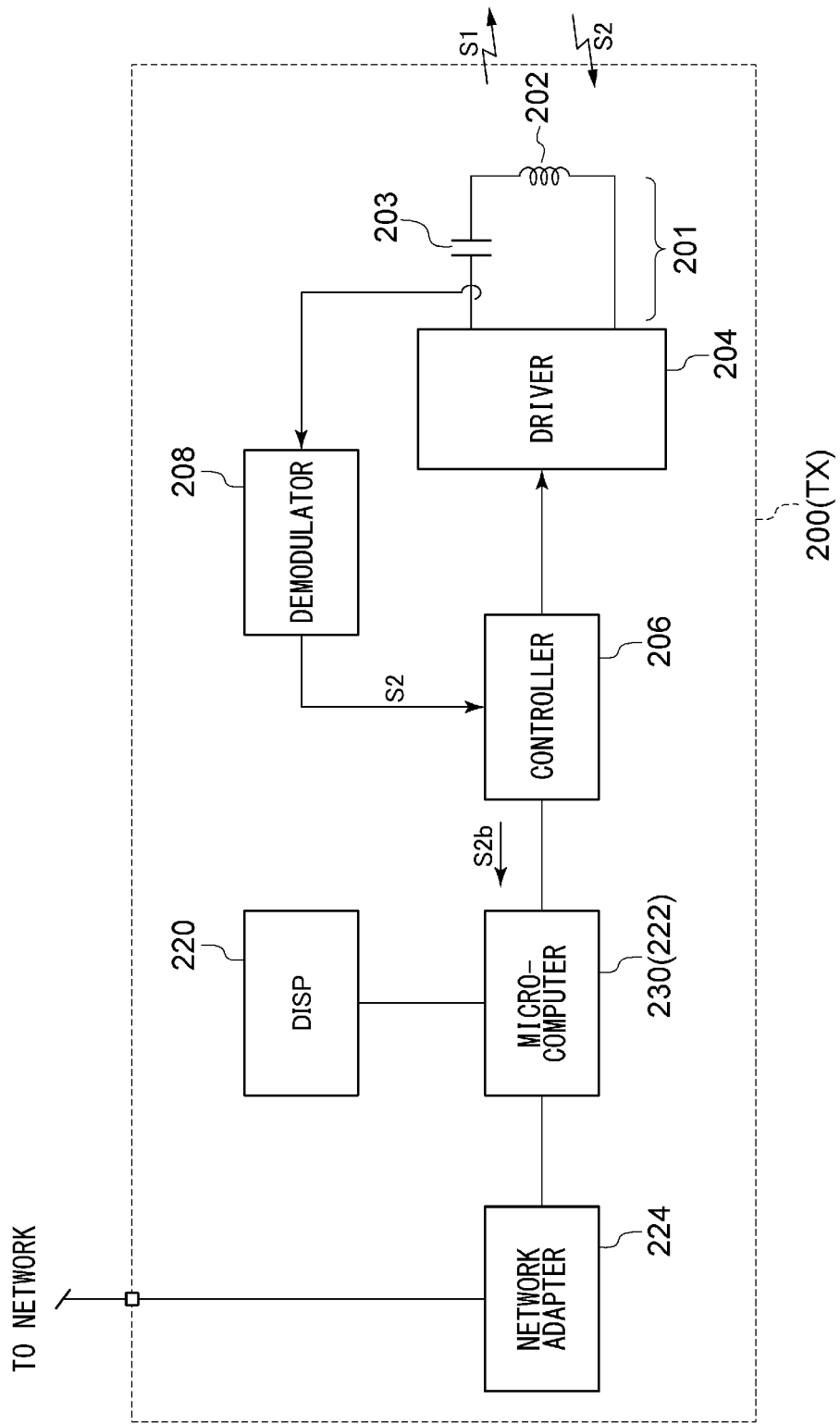
FIG. 2 is a block diagram showing a power transmitter.

Next, description will be made regarding the configuration of the power transmitter 200. FIG. 2 is a block diagram showing the power transmitter 200. The power transmitter 200 includes a transmission antenna 201, a driver 204, a controller 206, a demodulator 208, a display device 220, a microcomputer 230, and a network adapter 224.

The transmission antenna 201 is configured to transmit the electric power signal S1, and to receive the data from the wireless power receiver 300. The data S2 includes the control data S2a and the personal data S2b. For example, the transmission antenna 201 includes a transmission coil 202 and a resonance capacitor 203 connected in series.

The driver 204 drives the transmission antenna 201. The controller 206 controls the driver 204 according to the control data S2a received via the transmission antenna 201, and acquires the personal data S2b. The personal data S2b is input to the microcomputer 230.

The microcomputer 230 includes a display control unit 222 configured to control the display device 220, and to instruct the display device 220 to display the information that corresponds to the personal data S2b.

The microcomputer 230 is connected to the network adapter 224. The network adapter 224 may be configured as an Ethernet (trademark) adapter, a wireless LAN adapter, or the like.

The microcomputer 230 acquires the information that corresponds to the personal data S2b via the network, and instructs the display device 220 to display the information thus acquired. Furthermore, the microcomputer 230 uploads the information included in the personal data S2b to the server connected via the network.

Figure 3:
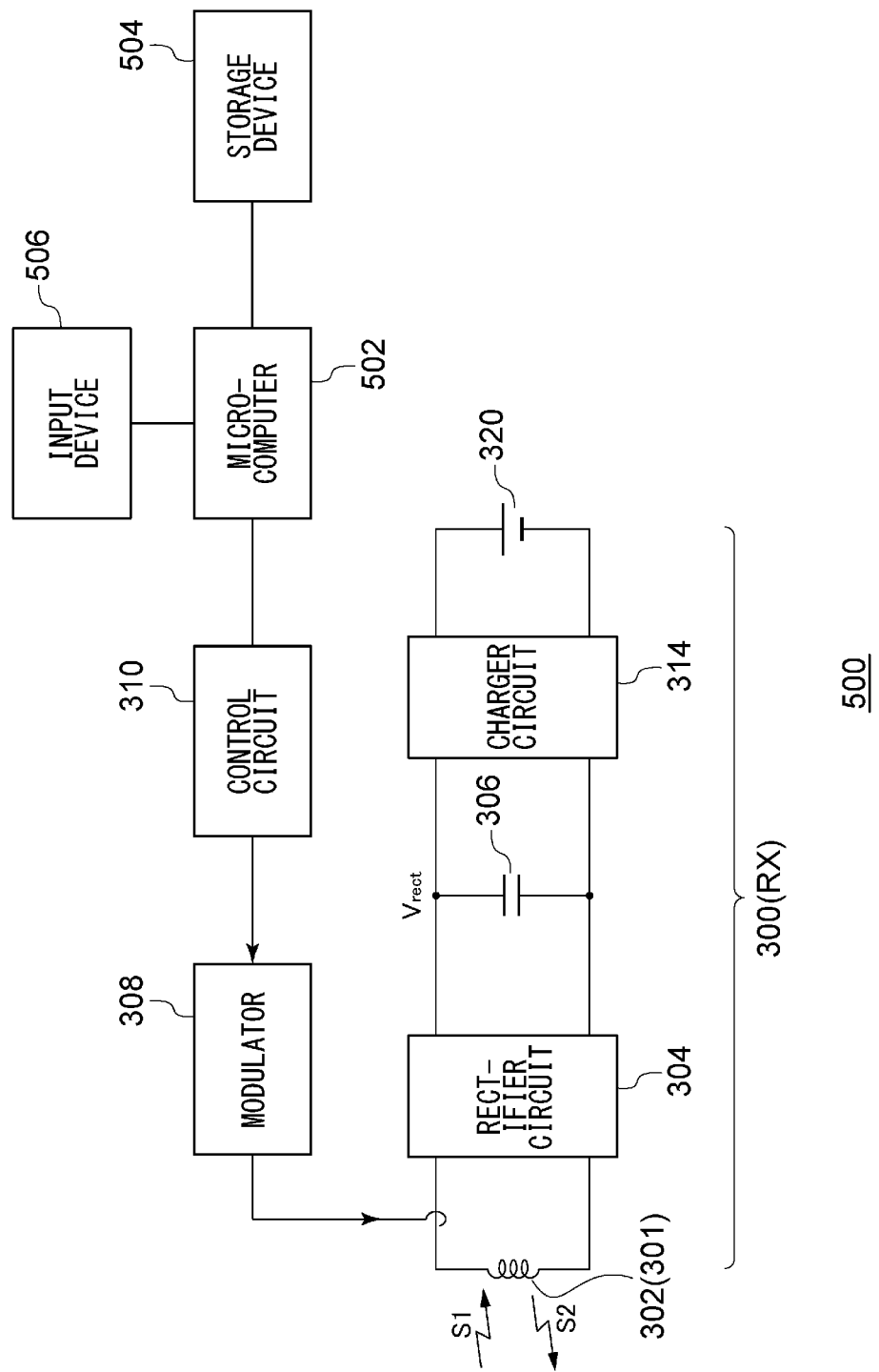
FIG. 3 is a block diagram showing an electronic device including a power receiver.

FIG. 3 is a block diagram showing an electronic device 500 including the power receiver 300. The electronic device 500 includes a microcomputer 502, a storage device 504, and an input apparatus 506.

The power receiver 300 includes a reception antenna 301 including a reception coil 302, a rectifier circuit 304, a smoothing capacitor 306, a modulator 308, a control circuit 310, a charger circuit 314, and a secondary battery 320.

The reception coil 302 is configured to receive the electric power signal S1 transmitted from the power transmitter 200, and to transmit the data S2 to the wireless power transmitter 200.

The rectifier circuit 304 rectifies the current that flows through the reception coil 302. The smoothing capacitor 306 is connected to the output of the rectifier circuit 304 so as to generate a rectified voltage Vrect. The charger circuit 314 receives the rectified voltage Vrect, and charges the secondary battery 320. The secondary battery 320 is configured as a power supply for the electronic device 500. The microcomputer 502, the storage device 504, the input device 506, and the like, each operate based on the voltage generated by the secondary battery 320. The control circuit 310 generates the data S2 to be transmitted via the reception antenna 301. The modulator 308 modulates the voltage across the reception antenna 301 or otherwise the current that flows through the reception antenna 301 according to the data S2.

The microcomputer 502 is configured as a processor that controls the overall operation of the electronic device 500. The storage device 504 is configured as a hard disk apparatus or otherwise an SSD. The input device 506 is configured as a user interface. Specifically, the input device 506 may be configured as a hardware keyboard, a software keyboard provided using a touch panel, or otherwise a voice input device (voice control device). The user 2 operates the electronic device 500 using the input device 506. The operation items include an input operation for inputting the personal data S2b described above. That is to say, the personal data S2b is input beforehand by the user 2 using the input device 506 before the power receiver 300 is mounted on the power supply mount 210, i.e., before the power supply operation. The personal data S2b thus input is stored in the storage device 504.

When the power receiver 300 is mounted on the power supply mount 210, communication starts between the power transmitter 200 and the power receiver 300. After a link is established between them, the microcomputer 502 reads out the personal data S2b from the storage device 504, and outputs the personal data S2b thus read out to the control circuit 310. This allows the personal data S2b to be transmitted to the power receiver 300 without the user 2 being conscious of the transmission of the personal data S2b, thereby providing the information optimized for the user 2.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding the wireless power supply system that conforms to the Qi standard. However, the present invention is not restricted to such an arrangement. Also, the present invention is applicable to a system that conforms to a standard similar to the Qi standard, and a system that conforms to a standard developed in the future.

Figure 4:
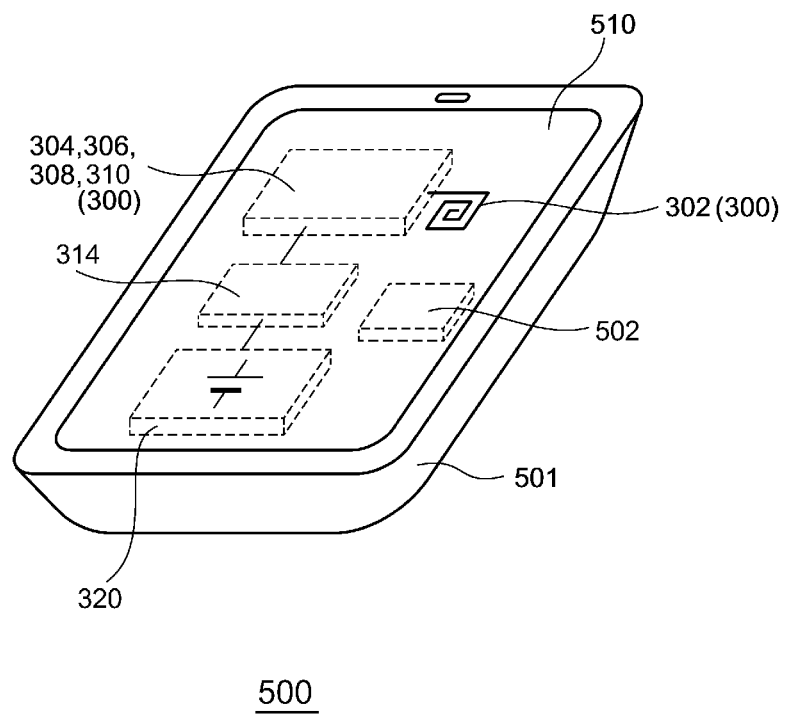
FIG. 4 is a diagram showing an electronic device including a power receiver according to an embodiment.

Lastly, description will be made regarding a specific example of the electronic device. FIG. 4 is a diagram showing the electronic device 500 including the power receiver 300 according to the embodiment. The electronic device 500 shown in FIG. 4 is configured as a smartphone, a tablet PC, a portable game machine, or a portable audio player. A casing 501 houses the processor 502 and a display device 510, in addition to the power receiver 300 described above. The processor 502 may correspond to the microcomputer shown in FIG. 3. Also, the processor 502 may include a wireless (RF) communication unit, a baseband processor, an application processor, an audio processor, or the like.

While the preferred embodiments of the present invention have been described using specific terms, such description is for illustrative purposes only, and it is to be understood that changes and variations may be made without departing from the spirit or scope of the appended claims.

What is claimed is:

1. A wireless power transmitter structured to supply an electric power signal to a wireless power receiver, the wireless power transmitter comprising:

a transmission antenna configured to transmit the electric power signal, and to receive data from the wireless power receiver, wherein the data comprises (i) control data to control the wireless power transmitter and (ii) personal data that indicates user-specific information with respect to a user of the wireless power receiver;
a driver structured to drive the transmission antenna; and
a controller structured to control the driver according to the control data received via the transmission antenna, and to acquire the personal data.

2. The wireless power transmitter according to claim 1, wherein the wireless power transmitter further comprises:
a display device; and
a display control unit structured to instruct the display device to display information that corresponds to the personal data.

3. The wireless power transmitter according to claim 2, wherein the wireless power transmitter further comprises a network adapter,
and wherein the display control unit is configured to acquire information that corresponds to the personal data via a network.

4. The wireless power transmitter according to claim 1, wherein the wireless power transmitter further comprises:
a network adapter; and
a data transmission unit structured to upload information included in the personal data to a server connected via a network.

5. The wireless power transmitter according to claim 1, further comprising a storage device structured to store information included in the personal data acquired by the controller.

6. The wireless power transmitter according to claim 1, wherein the user-specific information includes at least one from among data items representing a user's sex, age, residence, nationality, language, birth date, interests, concerns, occupation, family structure, and a keyword voluntarily entered by the user, with respect to a user of the wireless power receiver.

7. The wireless power transmitter according to claim 1, wherein the user-specific information is input beforehand by the user of the wireless power receiver.

8. The wireless power transmitter according to claim 1, that conforms to the Qi standard.

9. A wireless power receiver that receives an electric power signal from a wireless power transmitter, the wireless power receiver comprising:
a reception antenna configured to receive the electric power signal, and to transmit data to the wireless power transmitter;
a rectifier circuit structured to rectify a current that flows through the reception antenna;
a smoothing capacitor that is connected to an output of the rectifier circuit, and that generates a rectified voltage;
a control circuit structured to generate data that is to be transmitted via the reception antenna, wherein the data comprises (i) control data to be used to control the wireless power transmitter and (ii) personal data that indicates user-specific information with respect to a user of the wireless power receiver; and
a modulator structured to modulate, according to the data, a voltage or a current provided by the reception antenna.

10. The wireless power receiver according to claim 9, wherein the user-specific information includes at least one from among data items representing a user's sex, age, residence, nationality, language, birth date, interests, concerns, occupation, family structure, and a keyword voluntarily entered by the user, with respect to a user of the wireless power receiver.

11. The wireless power receiver according to claim 9, wherein the user-specific information is input beforehand by the user of the wireless power receiver.

12. The wireless power receiver according to claim 9, that conforms to the Qi standard.

13. An electronic device comprising the wireless power receiver according to claim 9.

14. The electronic device according to claim 13, further comprising an input device that allows a user to input user-specific information.

15. A wireless power supply system comprising:
the wireless power transmitter according to claim 1; and
the wireless power receiver according to claim 9.

16. A wireless power supply method for a wireless power supply system, comprising:
instructing a wireless power transmitter to transmit an electric power signal, and to receive data from a wireless power receiver, wherein the data comprises (i) control data to control the wireless power transmitter and (ii) personal data that indicates user-specific information with respect to a user of the wireless power receiver;
instructing the wireless power transmitter to control transmitted electric power based on the control data;
instructing the wireless power transmitter to display information that corresponds to the personal data on a display device;
instructing the wireless power receiver to receive the electric power signal;
instructing the wireless power receiver to generate data that is to be transmitted via a reception antenna, and that includes the control data and the personal data; and
instructing the wireless power receiver to modulate, according to the data, a voltage or otherwise a current provided by the reception antenna.

* * * * *